United States Patent
Wüllrich et al.

(10) Patent No.: US 10,328,779 B2
(45) Date of Patent: Jun. 25, 2019

(54) CONVERTIBLE VEHICLE TOP HAVING ROOF LINKS THAT CAN BE PIVOTED TOGETHER

(71) Applicant: Webasto-Edscha Cabrio GmbH, Stockdorf (DE)

(72) Inventors: Heinrich Wüllrich, Stockdorf (DE); Magnus Sviberg, Stockdorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 329 days.

(21) Appl. No.: 15/211,715

(22) Filed: Jul. 15, 2016

(65) Prior Publication Data

US 2017/0015181 A1    Jan. 19, 2017

(30) Foreign Application Priority Data

Jul. 16, 2015  (DE) .......................... 10 2015 111 557

(51) Int. Cl.
  *B60J 7/14*  (2006.01)

(52) U.S. Cl.
  CPC ..................................... *B60J 7/146* (2013.01)

(58) Field of Classification Search
  CPC ... B60J 7/145; B60J 7/146; B60J 7/201; B60J 1/1823; B60J 7/028; B60J 7/148; B60J 7/202; B60J 1/183
  USPC ......... 296/107.17, 108, 107.07, 121, 146.14, 296/65.16, 56, 26.02, 213, 215
  See application file for complete search history.

(56) References Cited

U.S. PATENT DOCUMENTS

| | | | | |
|---|---|---|---|---|
| 6,336,673 | B1 * | 1/2002 | Rothe | B60J 7/146 296/107.17 |
| 6,478,362 | B2 * | 11/2002 | Obendiek | B60J 7/145 296/108 |
| 6,502,891 | B2 * | 1/2003 | Russke | B60J 7/146 296/107.17 |
| 6,736,444 | B2 | 5/2004 | Reinsch | |
| 6,767,045 | B2 | 7/2004 | Reinsch | |
| 7,182,389 | B2 * | 2/2007 | Bruder | B60J 7/146 296/108 |

FOREIGN PATENT DOCUMENTS

| | | |
|---|---|---|
| DE | 10150219 A1 | 4/2003 |
| DE | 10150218 A1 | 5/2003 |
| DE | 10258054 A1 | 10/2003 |
| DE | 10229808 A1 | 11/2003 |
| DE | 10243085 A1 | 3/2004 |

* cited by examiner

*Primary Examiner* — D Glenn Dayoan
*Assistant Examiner* — Sunsurraye Westbrook
(74) *Attorney, Agent, or Firm* — Quarles & Brady LLP

(57) ABSTRACT

A top of a convertible vehicle includes a top linkage. A linkage mechanism forming part of the top linkage is on each of two opposing sides of the top linkage with respect to a vertical longitudinal center plane of the top. Each linkage mechanism includes a main multi joint mechanism pivotably mounted on a vehicle-fixed main bearing, a middle roof link, a forward roof link pivotably connected to the middle roof link, and a rear roof link pivotably connected to the middle roof link. The forward roof link and the rear roof link are pivotable together in relation to the middle roof link by a coupling rod, and the main multi joint mechanism is driven by a main drive. The forward roof link and the rear roof link are driven by the main drive via a coupling device so as to pivot in relation to the middle roof link.

11 Claims, 22 Drawing Sheets

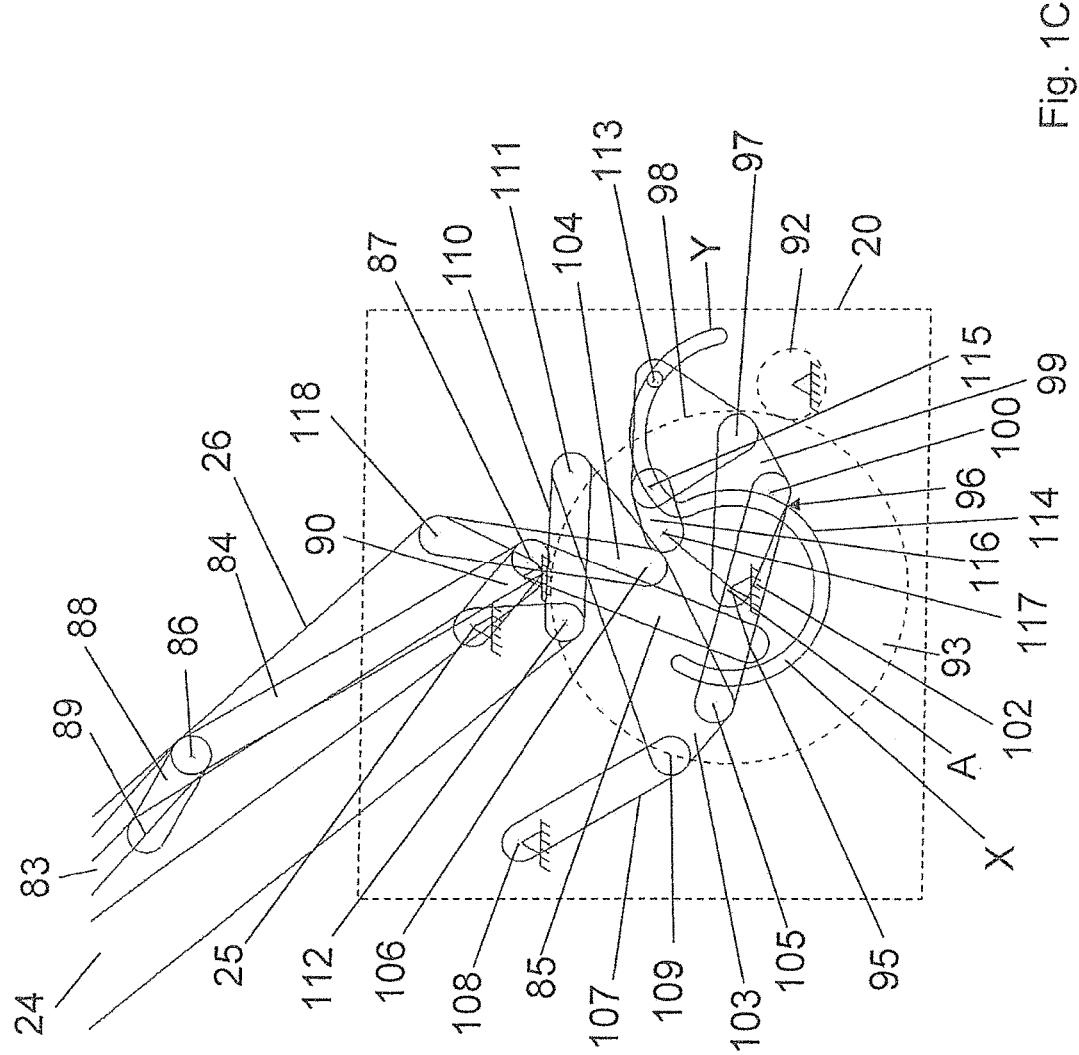

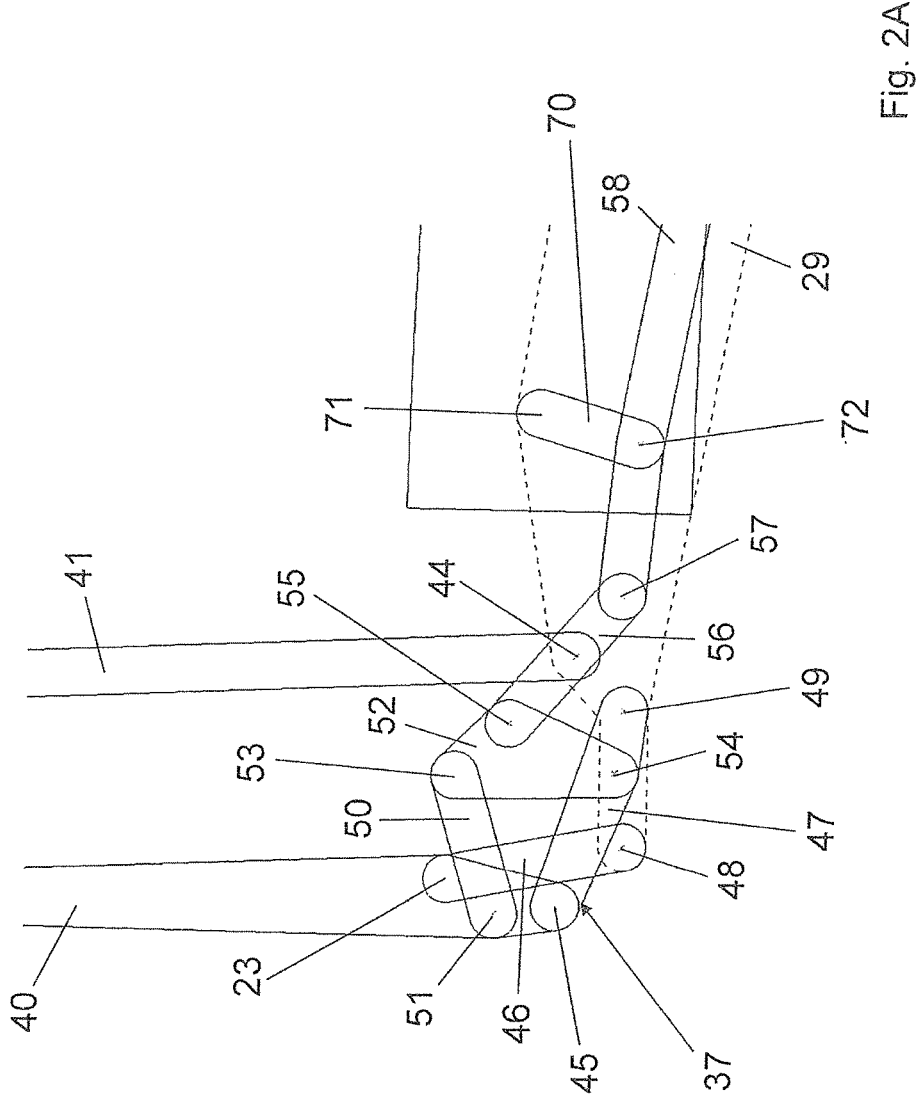

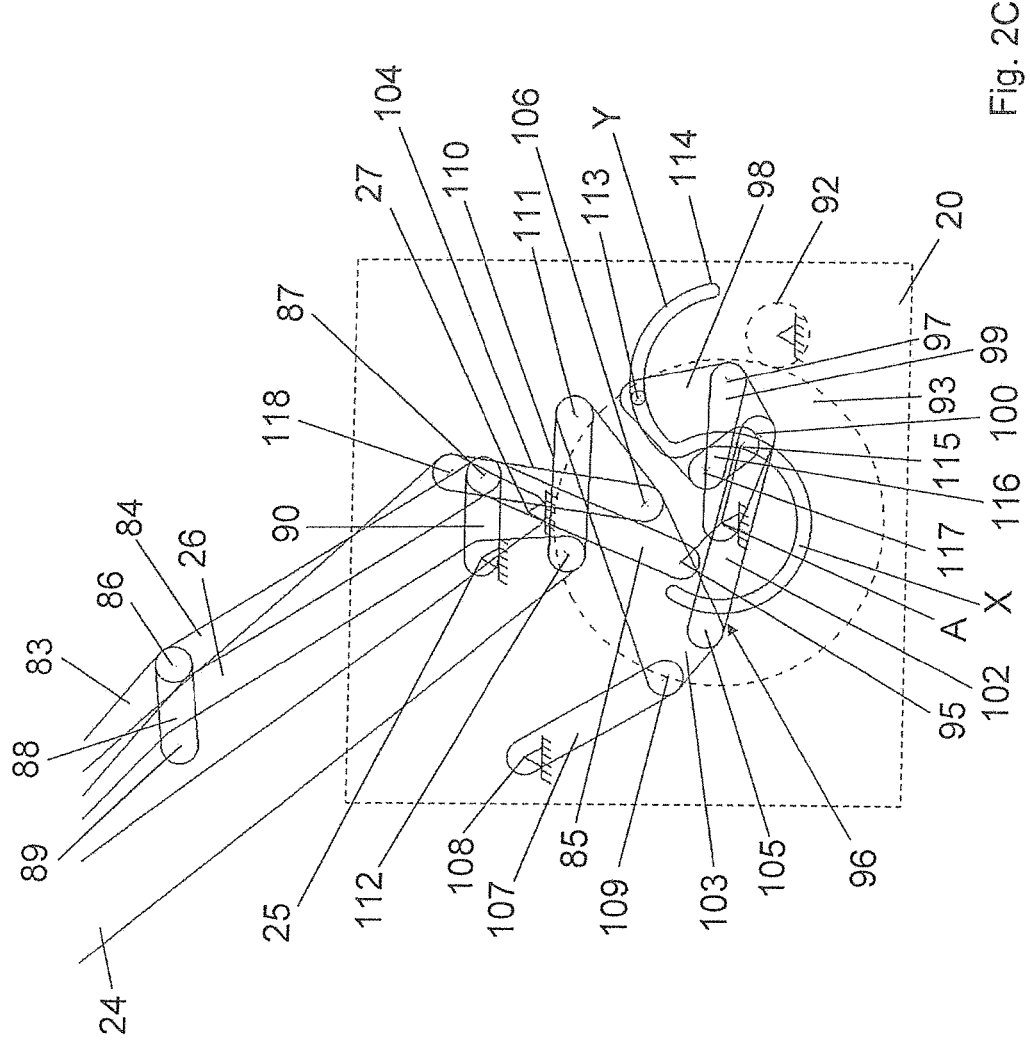

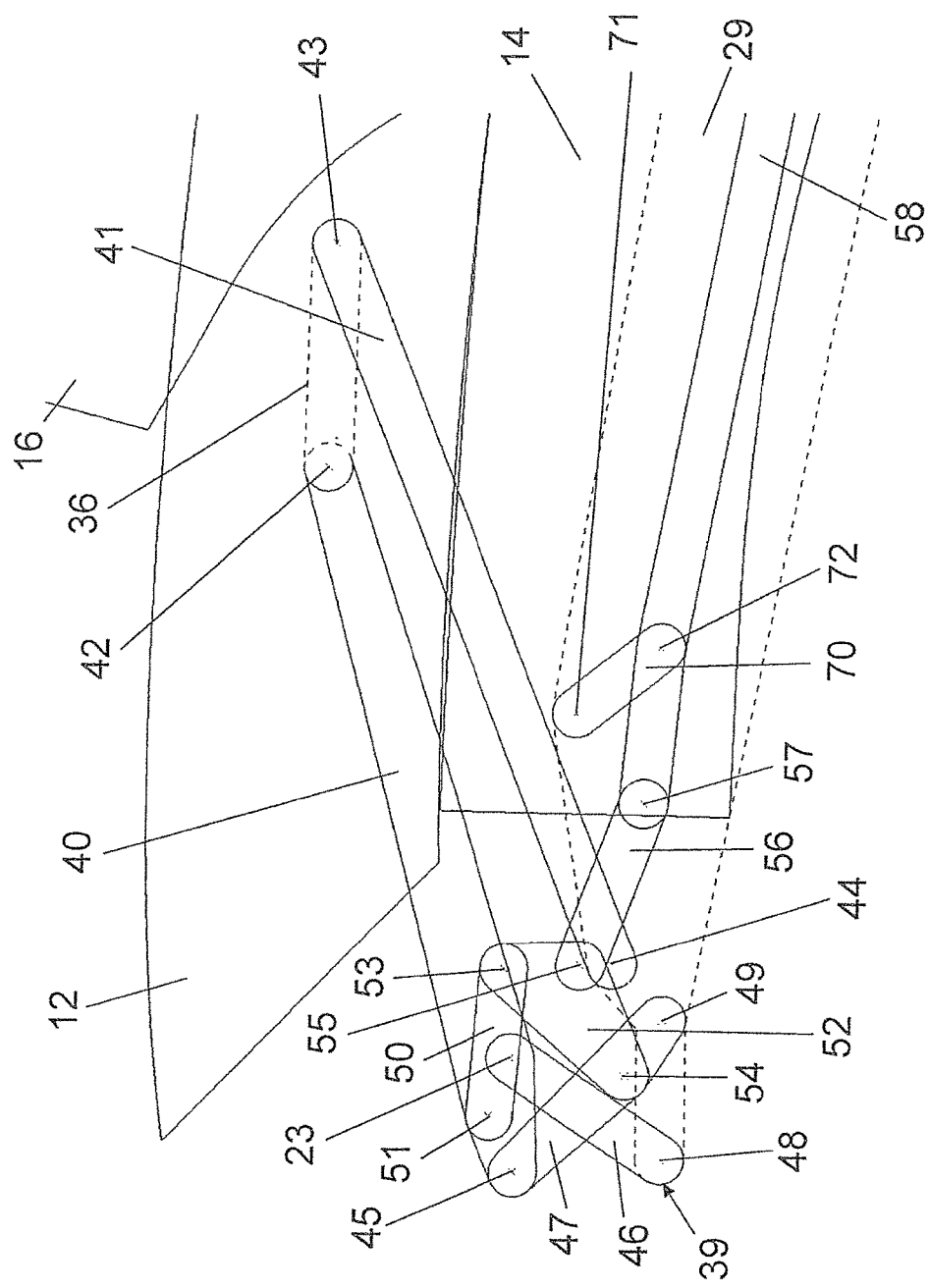

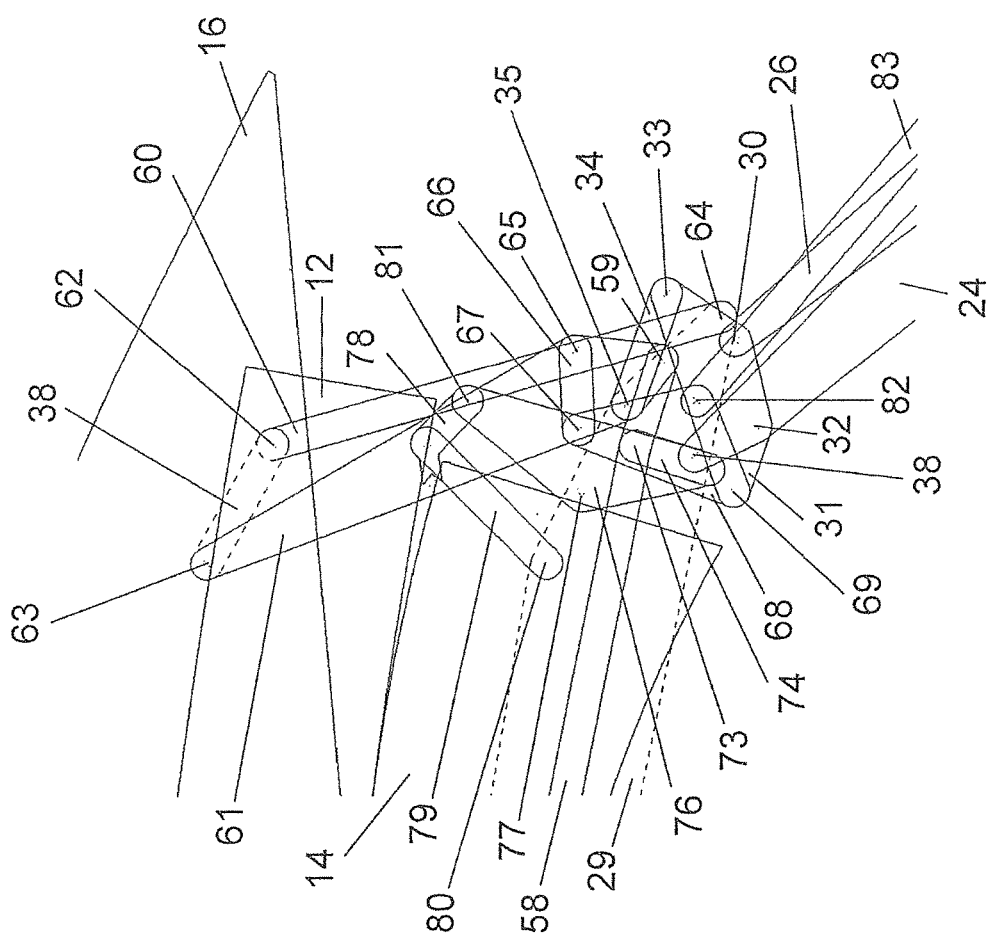

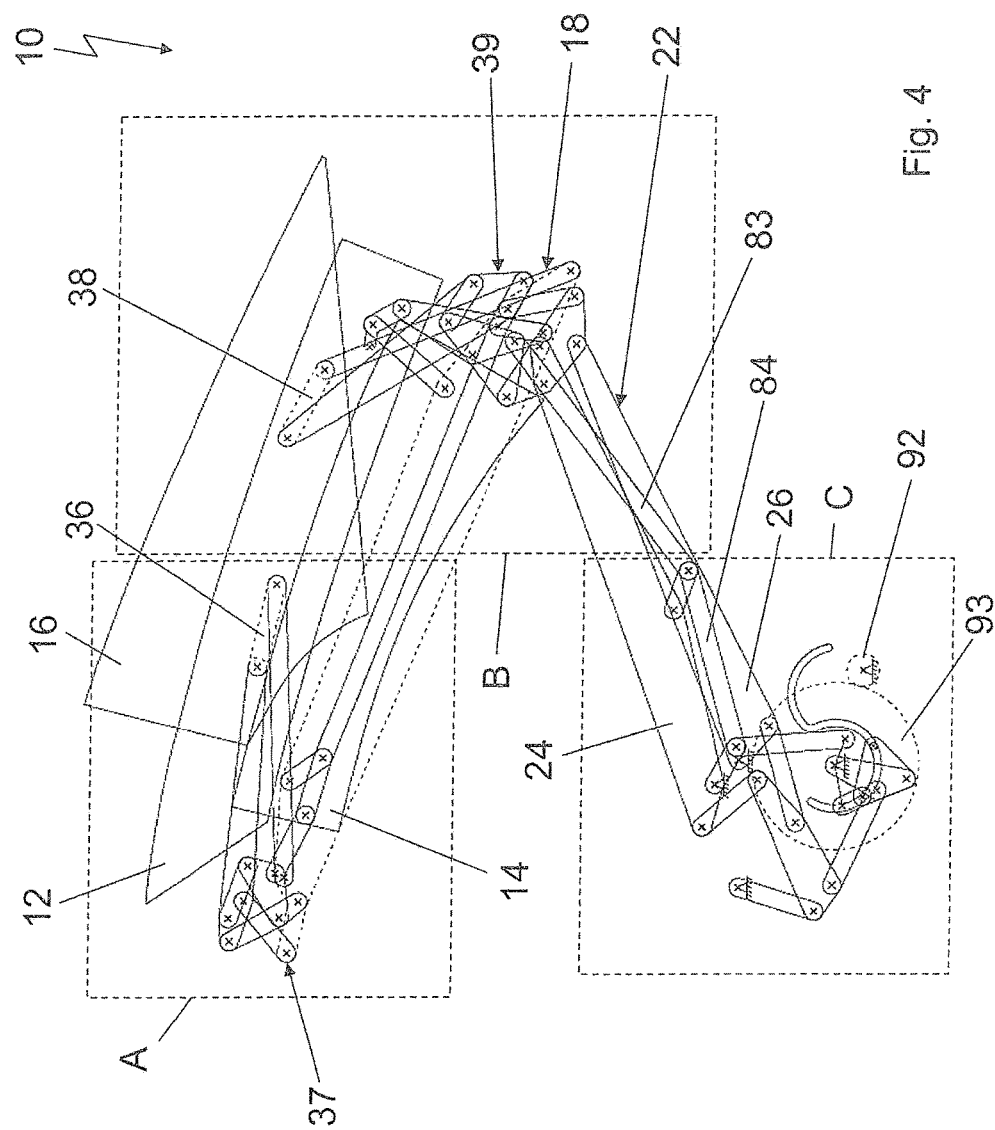

CONVERTIBLE VEHICLE TOP HAVING ROOF LINKS THAT CAN BE PIVOTED TOGETHER

CROSS REFERENCE TO RELATED APPLICATION

This application claims the priority benefit of German Patent Application No. 10 2015 111 557.3 filed on Jul. 16, 2015, which is fully incorporated herein by reference.

STATEMENT REGARDING FEDERALLY SPONSORED RESEARCH OR DEVELOPMENT

Not applicable.

FIELD OF THE INVENTION

The invention relates to a top of a convertible vehicle.

BACKGROUND OF THE INVENTION

A top of this kind is known from practice and comprises a top linkage and is realized as what is known as a retractable hard top, for example, having three rigid roof shells, which are adjustable by means of a top linkage between a closed position, in which a vehicle interior is covered by the top, and a storage position, in which the vehicle interior is uncovered. The top linkage comprises a linkage mechanism on each of its two sides with respect to a vertical longitudinal center plane of the top, each linkage mechanism being pivotably mounted on a respective rear-side main bearing, which is fixed to the vehicle. Each linkage mechanism comprises a main multi joint mechanism having two main links mounted on the respective main bearing, a middle roof link, to which a middle roof shell is connected, a forward roof link, which is pivotably connected to the middle roof link and to which a forward roof shell is connected, and a rear roof link, which is pivotably connected to the middle roof link and to which a rear roof shell is connected, which has a rear window. When adjusting the top from the closed position into the storage position, at first, the forward roof shell and the rear roof shell are pivoted together to a position above the middle roof shell. Subsequently, the package composed of the three roof shells is placed in a rear-side top storage box of the vehicle in question by means of the main multi joint mechanism. The adjusting movement of the forward roof shell and of the rear roof shell in relation to the middle roof shell takes place by means of a hydraulic drive, which is arranged in the area of the middle roof link. Placement of the package composed of the three roof shells in the top storage box takes place by means of a main drive, which is arranged in the area of the respective main bearing and acts on one of the two main links.

The top described above has the disadvantage that the hydraulic drive in the area of the middle roof link for the forward roof shell and the rear roof shell takes up a lot of installation space and also causes high costs because additional hydraulic lines and a hydraulic pump have to be provided in the vehicle.

SUMMARY OF THE INVENTION

The object of the invention is to provide a top of the kind mentioned above that is optimized in terms of installation space and cost with respect to the shared drive for the forward roof link and the rear roof link. This object is attained by the top having the features described herein.

According to embodiments of the invention described herein, it is thus proposed that the forward roof link and the rear roof link of a linkage mechanism of the top linkage are driven by means of the main drive via a coupling device so as to pivot in relation to the middle roof link of said linkage mechanism. In the top according to the invention, the main drive is thus used both to drive the main multi joint mechanism and to adjust the forward roof link and the rear roof link in relation to the middle roof link. Hence, no installation space has to be reserved for a separate drive in the area of the middle roof link. Also, there are no costs for the separate drive. Moreover, a mechanical synchronization of the movements of the main multi-joint mechanism and of the roof shells is possible.

In a specific embodiment of the top according to the invention, the coupling device comprises a coupling link mechanism, which is guided along the main link mechanism and which is connected to a multi joint mechanism to which the rear roof link is linked. In general, the multi joint mechanism to which the rear roof link is linked comprises at least two links, which are connected to the middle roof link via a simple joint or via multiple joints. One of these two links can be driven by means of the coupling link mechanism, allowing the rear roof link to be pivoted in relation to the middle roof link.

In a specific embodiment of the top according to the invention, the coupling link mechanism comprises at least two coupling links, which are supported in a shared point of articulation or on shared points of articulation on a diverting lever, which is pivotably mounted on one of the main links or on the main bearing. Dividing the coupling link mechanism into multiple coupling links allows following the path of the main multi-joint mechanism from the main bearing to the respective multi joint mechanism for the rear roof link in a precise and desired manner.

The top according to the invention is realized in particular as a retractable hard top and as such comprises in particular three roof shells, of which a forward one is attached to the forward roof link, a middle one is attached to the middle roof link and a rear one is attached to the rear roof link.

It is also possible, however, that the top according to the invention is a soft top and that the forward roof link serves to connect a forward bow and the middle roof link is associated with a roof side rail and the rear roof link serves to drive a rear-side roof element, such as a fin of a so-called fin roof.

In a preferred embodiment of the top, the multi joint mechanism, by means of which the rear side roof link can be adjusted in relation to the middle roof link, comprises a triangular control arm, which is pivotably mounted on a diverting lever interconnecting the two main links and to which the coupling link mechanism and a control link are linked, the control link being connected to a link to which the rear roof link is linked. In particular in case of a retractable hard top, this link is a link that called a shell main link in this case and whose pivoting causes the rear roof shell to be adjusted in relation to the middle roof shell.

To be able to transmit the adjusting movement of the rear roof link to the forward roof link, the coupling rod is connected to the link that is linked to the rear roof link, for example. The coupling rod is thus guided along the middle roof link toward a link mechanism for the forward roof link.

The main drive, by means of which the main multi joint mechanism is driven, can be realized as a hydraulic drive or as an electric motor. In particular in case of a main drive realized as an electric motor, a drive wheel may be provided, to which the coupling link mechanism is linked. The drive wheel is a gear wheel, for example, which is driven by means of a drive pinion of the electric motor.

To keep the number of drive components small, the drive wheel can drive not only the coupling link mechanism but also the main multi joint mechanism. In this case, it may be advantageous if the drive wheel acts on a transmission, being in particular a reduction gear or speed reducer, which drives the main link mechanism and which is formed between the drive wheel and the driven main link of the main multi joint mechanism in the form of multiple intermediate links.

It is advantageous if the roof links are adjusted in relation to one another prior to the lowering of the roof shells or of the roof links into the top storage box. To ensure this, in an advantageous embodiment of the top according to the invention, the coupling link mechanism is always subjected to a drive torque when the drive wheel rotates, whereas the main link mechanism is either kept in position or subjected to a drive torque as a function of the position of a guiding element in a guide rail, which is fixed to the main bearing. The motion sequence when adjusting the top can thus be controlled through the guide rail.

Control of the drive torque acting on the main multi joint mechanism can be realized, for example, in that the guiding element is formed on a control link that is pivotably connected to a triangular link whose pivot axis coincides with an axis of rotation of the drive wheel. When the main multi joint mechanism is subjected to a drive torque, the triangular link is arranged for co-rotation in relation to the drive wheel due to a corresponding position of the control link with respect to the guide rail, allowing the drive torque to be transmitted from the triangular link to one of the main links of the main multi joint mechanism via an intermediate link mechanism.

In an advantageous embodiment of the top according to the invention, the guide rail is divided into multiple sections. In particular, it has a first guiding section, which extends concentrically to the circumference of the drive wheel, whereas a second guiding section of the guide rail extends in an arc in the opposite sense of the first guiding section, so that the drive torque is introduced into the main multi joint mechanism by the drive wheel when the guiding element is arranged in the first guiding section and the main multi joint mechanism stands still when the drive wheel is driven and the guiding element is arranged in the second guiding section.

Other advantages and advantageous embodiments of the subject-matter of the invention can be taken from the description, the drawing and the claims.

BRIEF DESCRIPTION OF THE DRAWINGS

An embodiment example of a convertible vehicle top according to the invention is illustrated in the drawing in a schematically simplified manner and will be explained in more detail in the following description. In the drawing.

DETAILED DESCRIPTION OF AN EMBODIMENT

Figure 5:
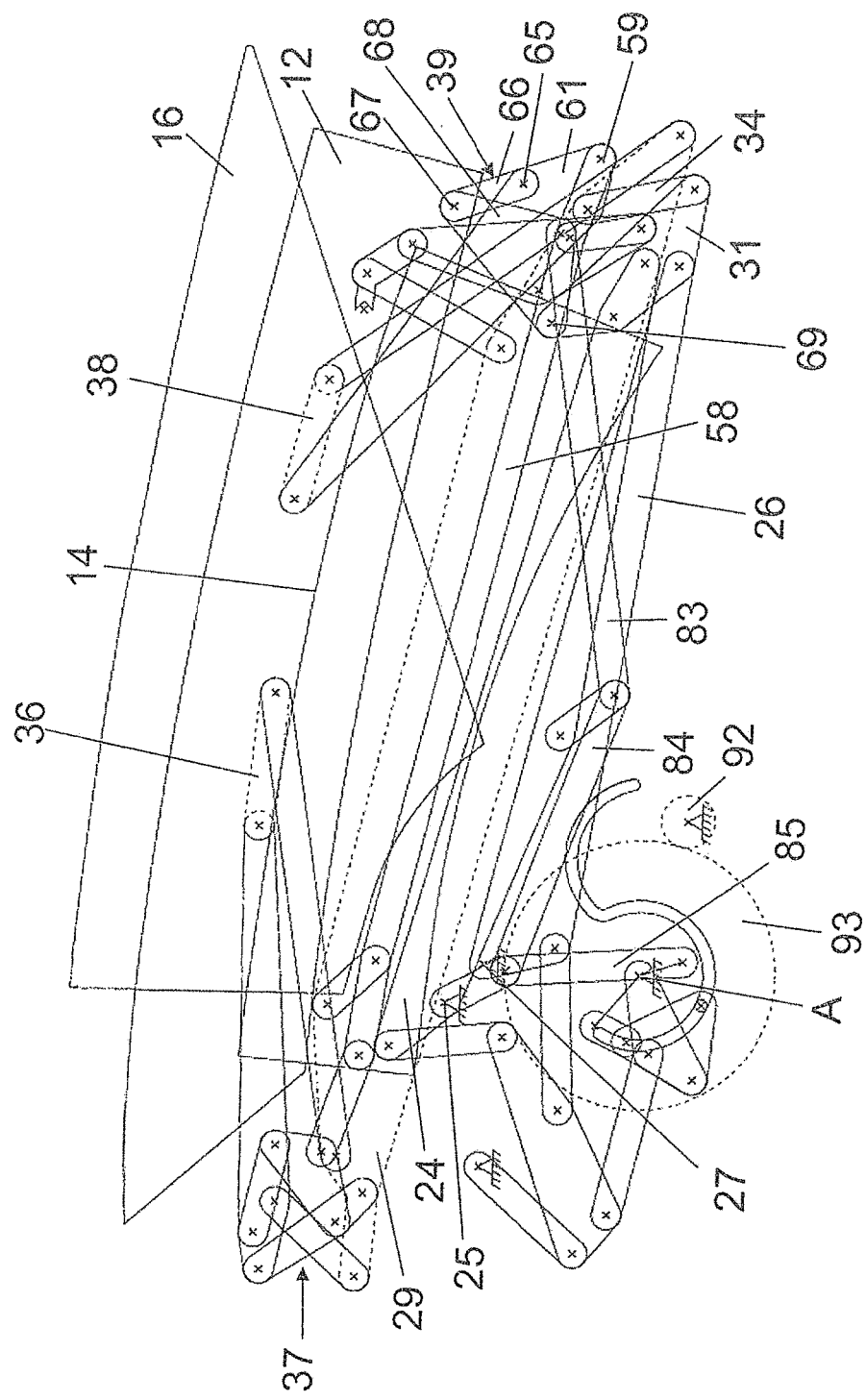
FIG. 5 also shows a view of the top corresponding to FIG. 1, but in the storage position.
Figure 6:
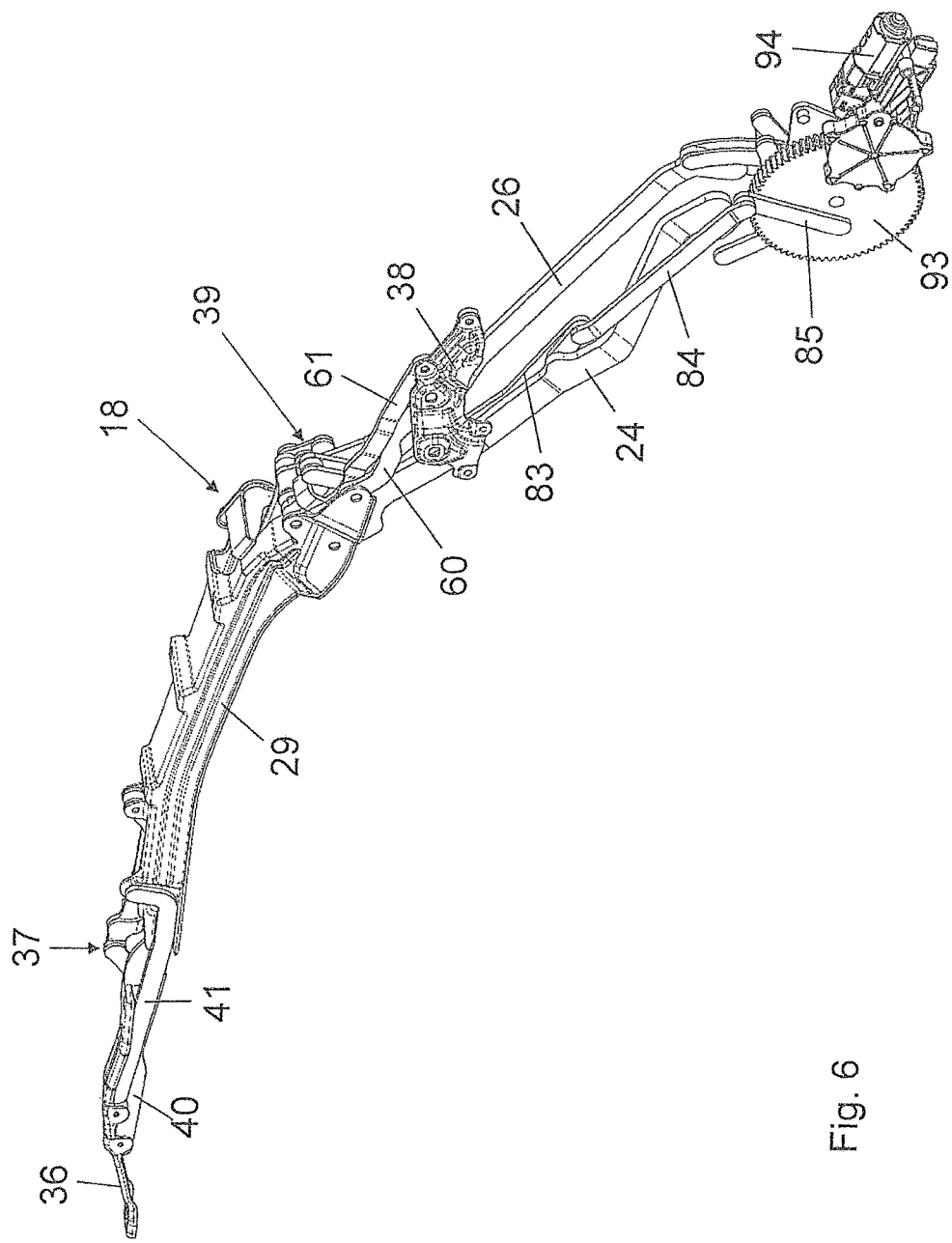
FIG. 6 shows a perspective view of a link mechanism of the top linkage with a drive unit in the closed position of the top.
Figure 7:
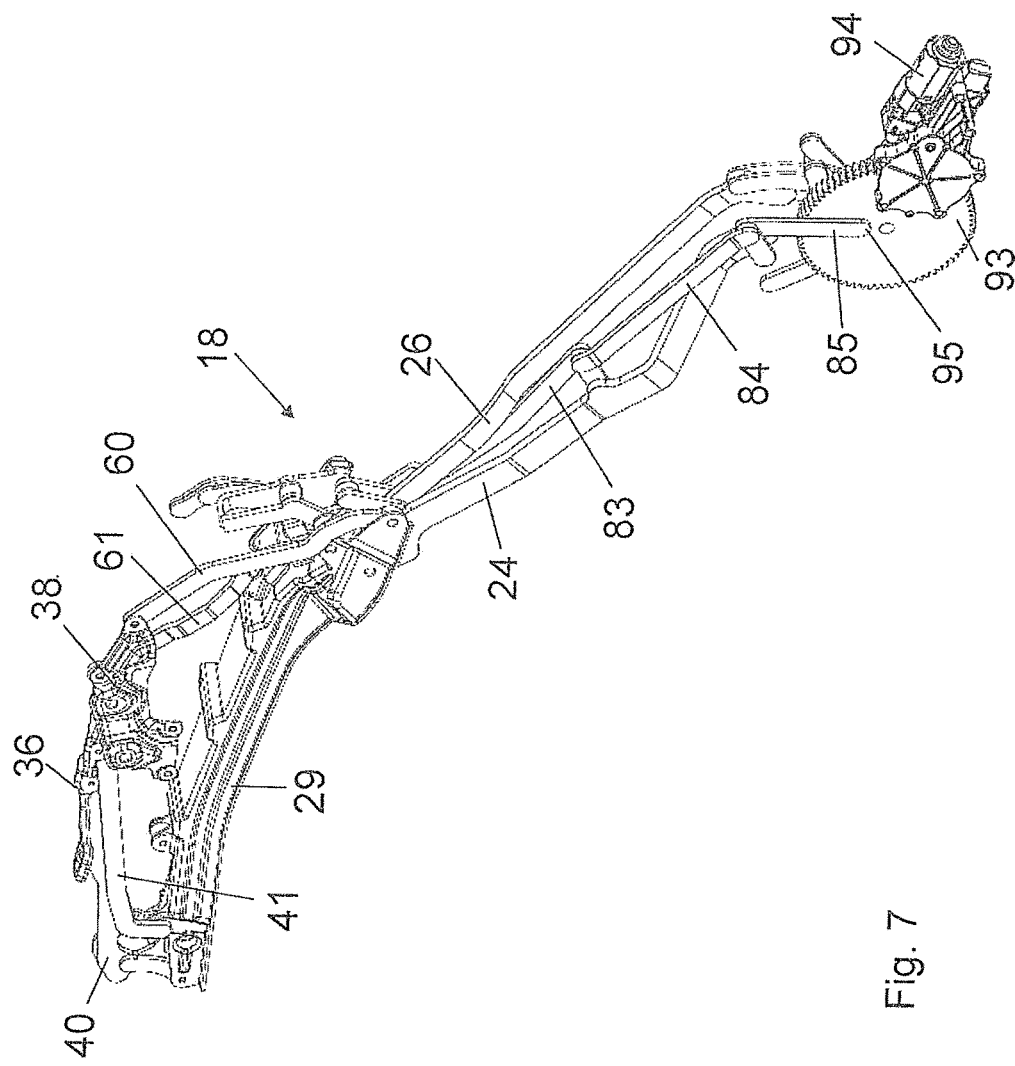
FIG. 7 shows a view of the link mechanism corresponding to FIG. 6 in the second intermediate position.
Figure 8:
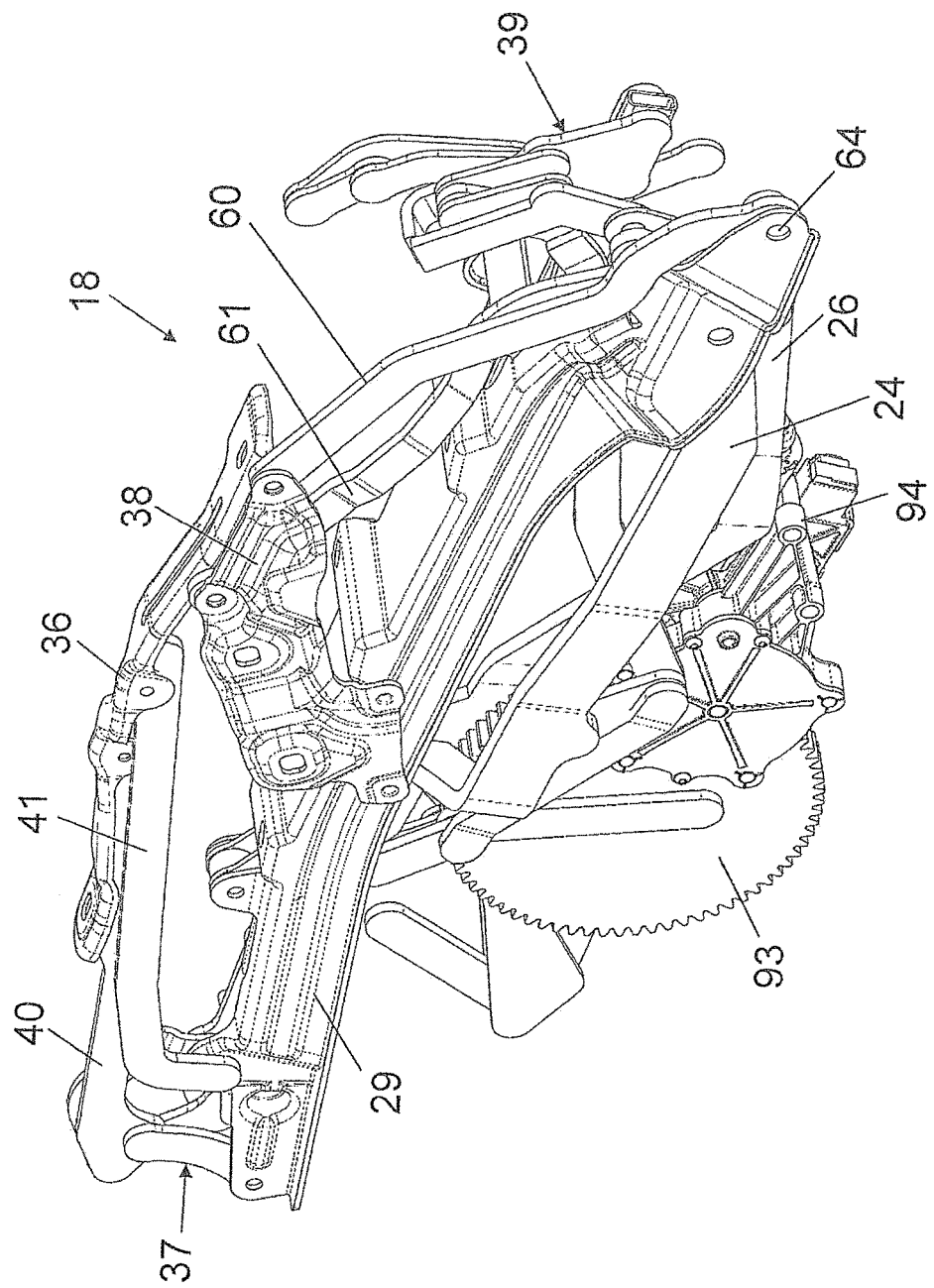
FIG. 8 shows a view of the link mechanism corresponding to FIG. 6, but in the storage position of the top.
Figure 9:
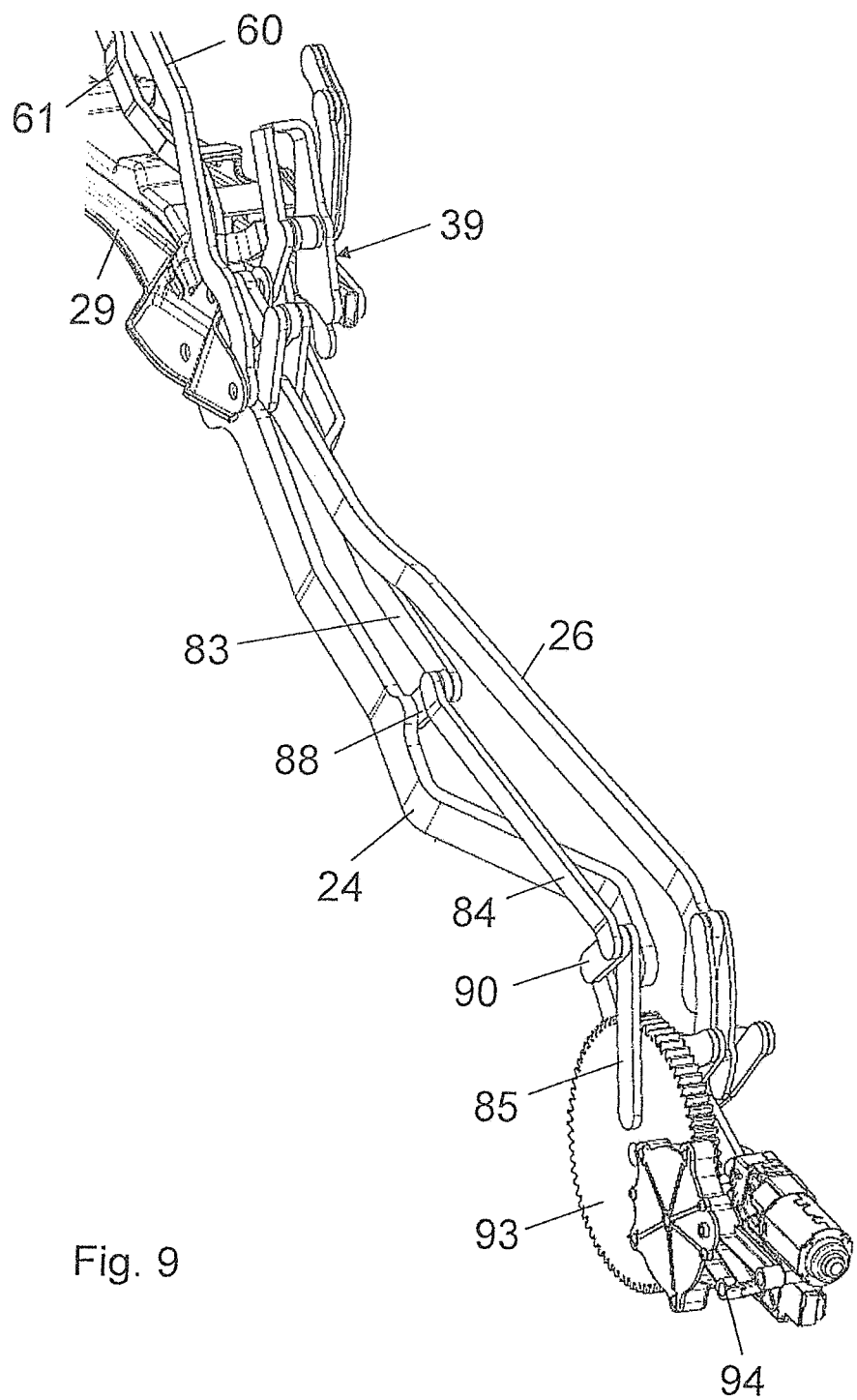
FIG. 9 shows an enlarged illustration of a rear section of the link mechanism in a first perspective illustration.
Figure 10:
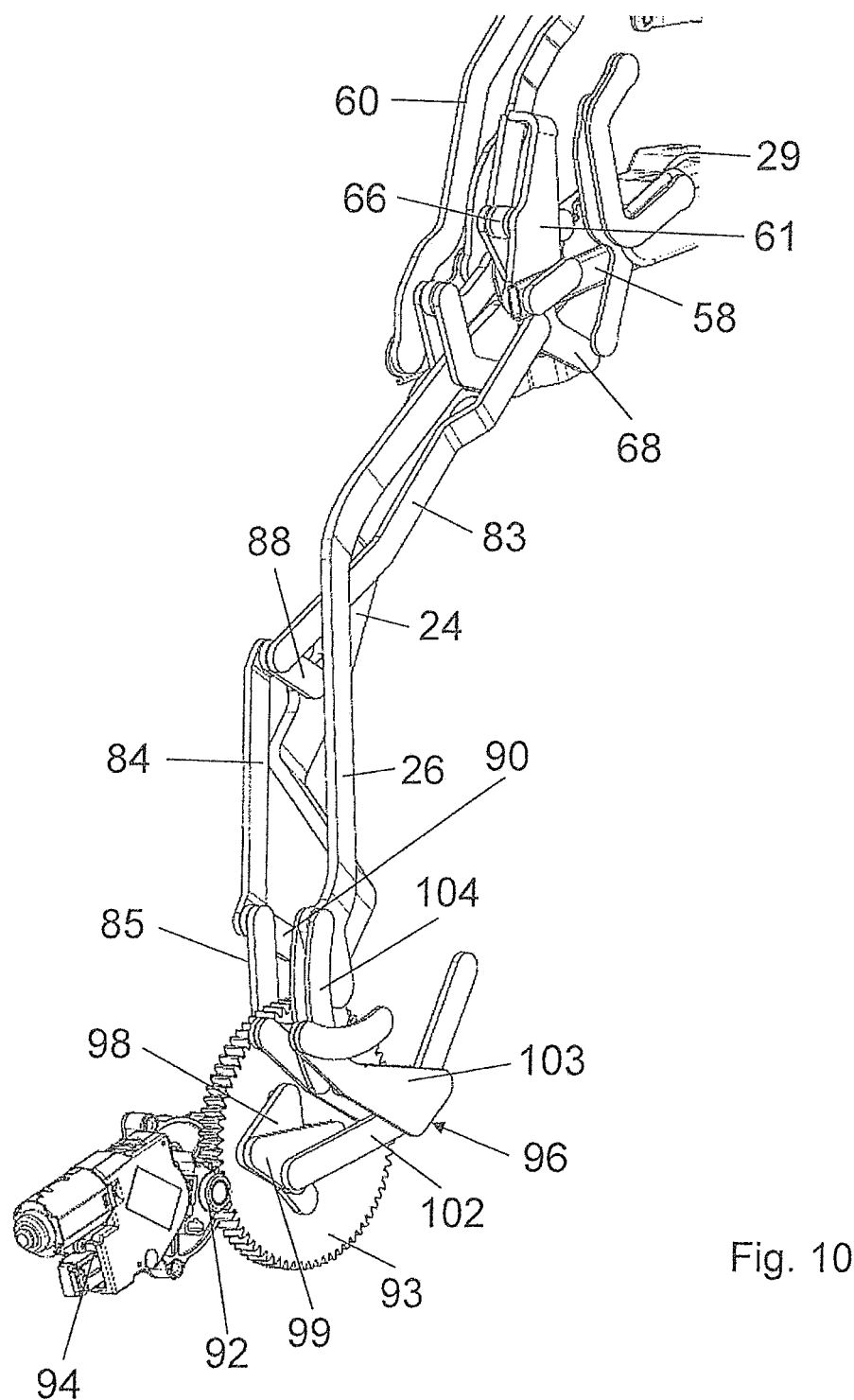
FIG. 10 shows a second perspective illustration of a rear section of the link mechanism.

The drawing illustrates a convertible roof 10 of an automobile realized as a convertible vehicle. The convertible roof 10 comprises three roof shells 12, 14 and 16, which are arranged one behind the other in the closed position illustrated in FIG. 1, and is thus realized as what is known as a retractable hard top. In the closed position of the top, the roof shells 12, 14 and 16 cover an interior of an automobile (not illustrated). In an open position, which is illustrated in FIG. 5, the roof shells 12, 14 and 16 are arranged in a rear-side top storage box of the automobile in question, leaving the vehicle interior uncovered. To adjust the roof shells 12, 14 and 16, the roof shells are mounted on a linkage mechanism 18 of a top linkage on each of their two sides with respect to a vertical longitudinal center plane of the top, the linkage mechanisms 18 themselves being pivotably mounted on respective rear-side main bearings 20, which are arranged in the area of the rear-side top storage box and are indicated by dashed lines in FIGS. 1C and 2C.

The link mechanisms arranged on both sides are symmetrical to each other. Hence, for the sake of clarity, the following description will substantially focus solely on the linkage mechanism arranged on the left side with respect to the forward driving direction of the vehicle in question. This description is immediately applicable to the linkage mechanism arranged on the right side with respect to the forward driving direction.

Each linkage mechanism 18 comprises a main multi joint 22, which is mounted on the respective main bearing 20 and comprises a first main link 24, which is pivotably mounted on the main bearing 20 via a point of articulation 25, and a second main link 26, which is pivotably mounted on the main bearing 20 via a point of articulation 27. With its end that faces away from the main bearing 20, the first main link 24 is connected to a middle roof link 29 via a point of articulation 28, the middle roof link 29 being associated to the middle roof shell 14. With its end that faces away from the main bearing 20, the second main link 26 is linked to a diverting lever 31 via a point of articulation 30, the diverting lever 31 being pivotably mounted on the first main link 24 via a point of articulation 32. The diverting lever 31, in turn, is connected to a control lever 34 via another point of articulation 33, which is arranged rear-side of point of articulation 30, the control lever end that faces away from point of articulation 33 being linked to the middle roof link 29 via a point of articulation 35.

The forward roof shell 12 is associated to a forward roof link 36, which is connected to the middle roof link 29 via a forward multi joint mechanism 37. The rear roof shell 16 is attached to a rear roof link 38, which is connected to the middle roof link 29 via a rear multi joint mechanism 39.

The forward multi joint mechanism 37 has two shell main links 40 and 41, which are linked to the forward roof link 36 via points of articulation 42 and 43. With its end that faces away from the forward roof link 36, the shell main link 41 is directly linked to the middle roof link 29 via a point of articulation 44. In contrast, the other shell main link 40, in its end region facing away from roof link 36, is connected to two intermediate links 46 and 47 via points of articulation 23 and 45, the intermediate links 46 and 47 being linked to the middle roof link 29 via points of articulation 48 and 49.

To be able to pivot the forward or front-side roof shell 12 in relation to the middle roof shell 14, an articulated lever mechanism composed of a first lever 50, which is linked to the shell main link 40 via a point of articulation 51, and of a triangular link 52, which is connected to lever 50 via a point of articulation 53 at one side and linked to intermediate link 47 via a point of articulation 54 at the other side, is arranged between the shell main link 40 and intermediate link 47. An adjusting link 56 is connected to the triangular link 52 via a point of articulation 55, the adjusting link 56 being connected to a coupling rod 58 via a joint 57, the coupling rod 58 being mounted on the middle roof link 29 as described in more detail below and being connected to the rear multi joint mechanism 39 of the rear roof shell 16 via a point of articulation 59.

The rear multi joint mechanism 39 for the rear-side roof shell 16 has two shell main links 60 and 61, which are linked, via points of articulation 62 and 63, to the roof link 38 to which the rear roof shell 16 is attached. The shell main link 60 is linked to the rear-side end of the roof link 29 via a simple point of articulation 64. The shell main link 61, which is driven to pivot roof shell 16 in relation to the middle roof shell 14, is connected to a control link 66 via a point of articulation 65, the control link 66 itself being connected to a triangular link 68 via a point of articulation 67, the triangular link 68 being pivotably mounted on the diverting lever 31 via a point of articulation 69. Moreover, the shell main link 61 is pivotably linked to the middle roof link 29 via point of articulation 35.

The coupling rod 58, which leads to the forward multi joint mechanism 37, is connected to the shell main link 61 via point of articulation 59 in an end region that faces away from roof link 38 of roof shell 16.

As already described above, the coupling rod 58 is mounted on the middle roof link 29. This is achieved via a forward mounting lever 70, which is linked to the middle roof link 29 via a point of articulation 71 and to the coupling rod 58 via a point of articulation 72. Moreover, a mounting lever 74 is linked to the coupling rod 58 via a point of articulation 73, the mounting lever 74 being connected, via a point of articulation 75, to a triangular link 76, which is pivotably mounted on a link point 77 of the middle roof link 29. Moreover, the triangular link 76 is connected to another link point 80 of the middle roof link 29 via two intermediate links 78 and 79, which are articulated to each other. Intermediate link 78 has a point of articulation 81 on the triangular link 76.

For simultaneous pivoting of the forward roof shell 12 and of the rear roof shell 16 in relation to the middle roof shell 14, the triangular link 68, which is pivotably mounted on the diverting lever 31, is connected to a coupling link mechanism via point of articulation 82, the coupling link mechanism having three coupling links 83, 84 and 85, which are connected to one another via simple joints 86 and 87. At joint 86, which connects coupling links 83 and 84, a diverting lever 88 is also arranged, which is pivotably mounted on the first main link 24 via a point of articulation 89. To joint 87, which connects coupling links 84 and 85, another diverting lever 90 is connected, whose end that faces away from point of articulation 87 is fixedly mounted on the main bearing via point of articulation 25.

For being driven, the roof 10 has a drive motor 94 representing a main drive and comprising a drive pinion 92, which drives a drive wheel 93. The drive wheel 93 is connected to the coupling link 85 of the coupling link mechanism at one side via a point of articulation 95 so as to actuate the two roof shells 12 and 16. At the side that faces away from the coupling link 85, a drive linkage 96 for the main multi-joint 22 is connected to the drive wheel 93.

The drive linkage 96 comprises a control link 98, which is realized as a triangular link and is connected to a triangular control arm 99 in a point of articulation 97, the triangular control arm 99 being pivotable about the drive wheel axis A, which is fixed to the main bearing. Via a point of articulation 100, the triangular control arm 99 is additionally connected to a transmission, which comprises an intermediate link 102, an intermediate link 103 and an intermediate link 104, which are connected to each other via points of articulation 105 and 106, intermediate link 104 being linked to the second main link 26 via a point of articulation 118. Via a point of articulation 109, intermediate link 103 is connected to a first support lever 107, which is fixedly mounted on the main bearing on a link point 108, and is connected to the main link 24 on a link point 112 via a second support lever 110, which is linked in a point of articulation 111.

The control link 98 has a guiding pin 113, which is guided in an S-shaped guide rail 114, which is formed on the main bearing 20. Moreover, a transmission link 116 is linked to the control link 98 via a point of articulation 115, the transmission link end facing away from the control link 98 being connected to the drive wheel 93 via a link point 117.

The guide rail 114, which is formed on the main bearing 20, has a first rail section X, which is arc-shaped and extends concentrically to the circumference of the drive wheel 93 around its axis of rotation A. Rail section X extends across an area of about 180° to 220°. Adjacent to rail section X, there is a second rail section Y, which is also arc-shaped and extends in the opposite sense of rail section X. In the broadest sense, rail section Y extends radially with a curvature with respect to axis A.

The top described above or, more precisely, the linkage mechanism 18 of the top 10 described above works in the way described below.

Figure 1:
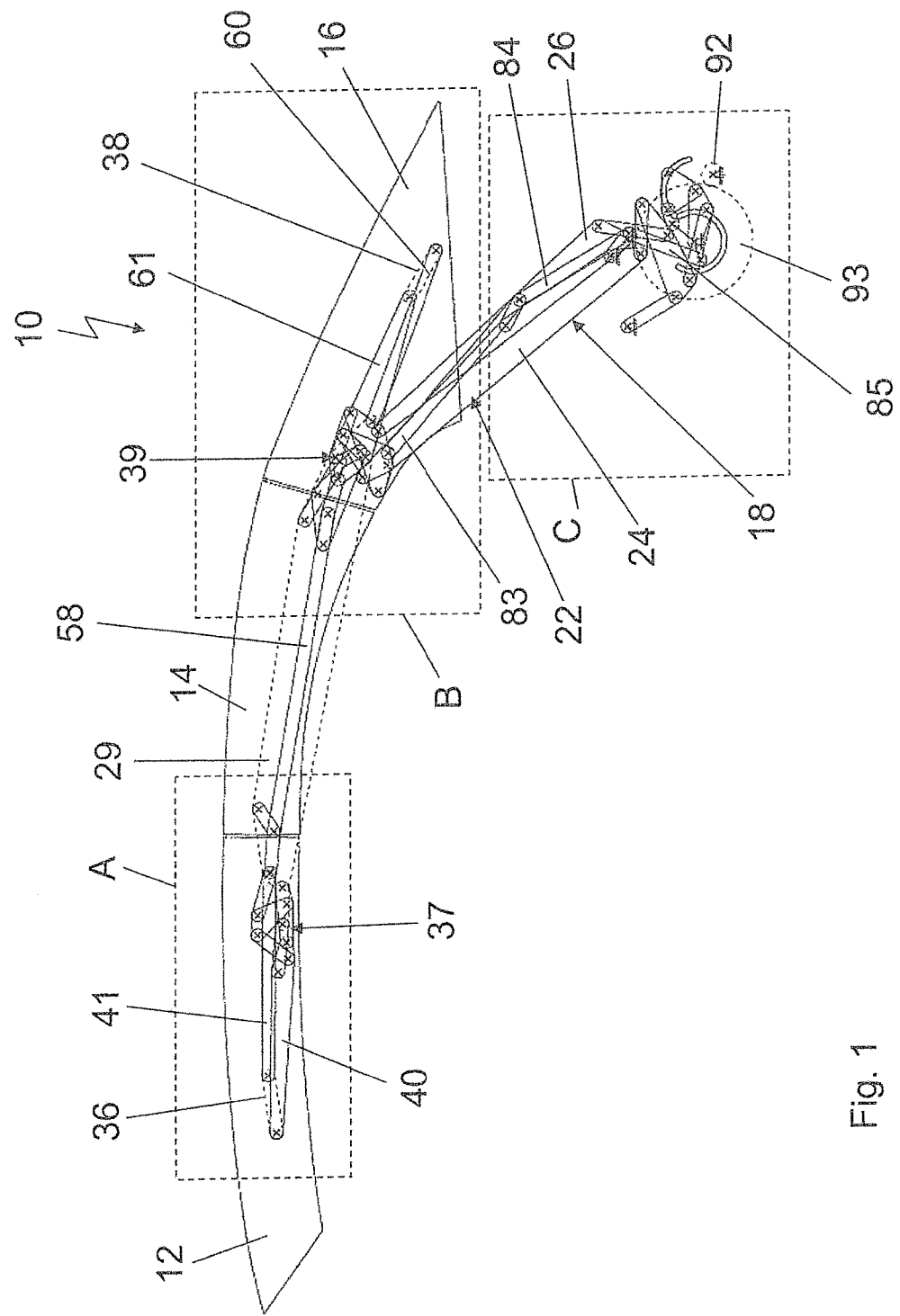
FIG. 1 shows a schematic lateral view of a convertible vehicle top according to the invention in the closed position.
Figure 1A:
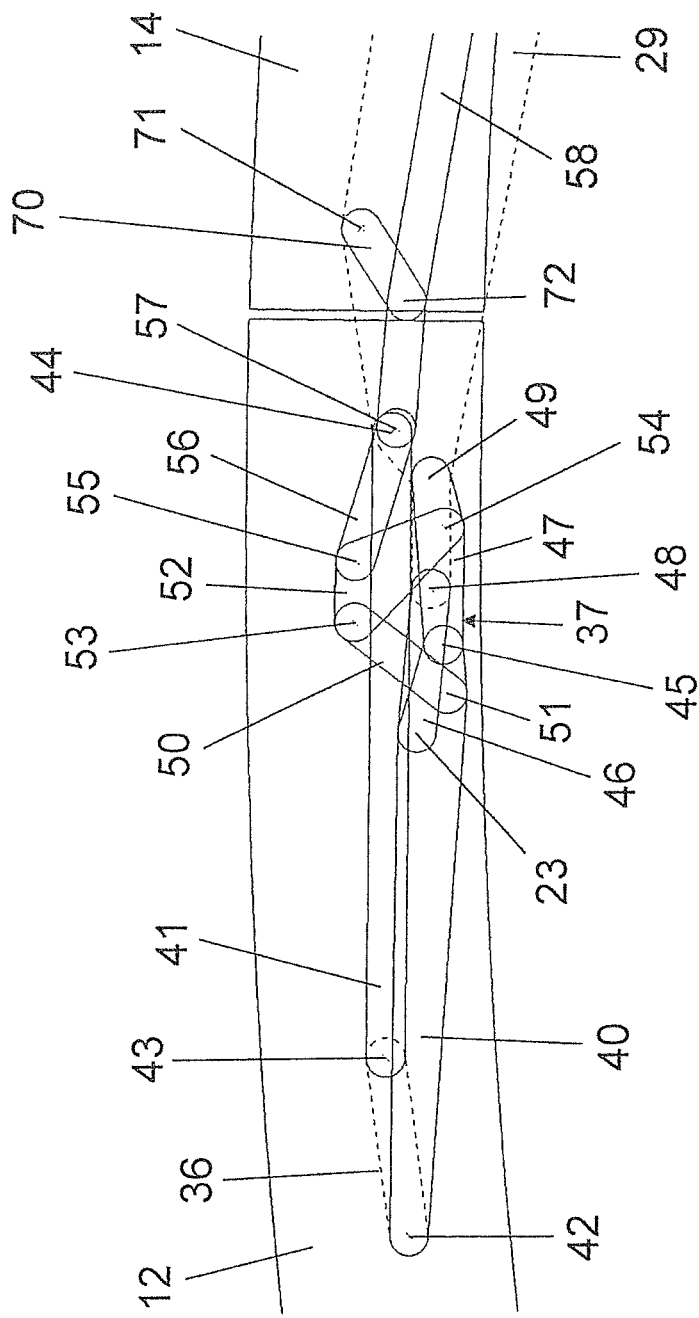
FIGS. 1A, B and C show enlarged illustrations of sections A, B and C in FIG. 1.
Figure 1B:
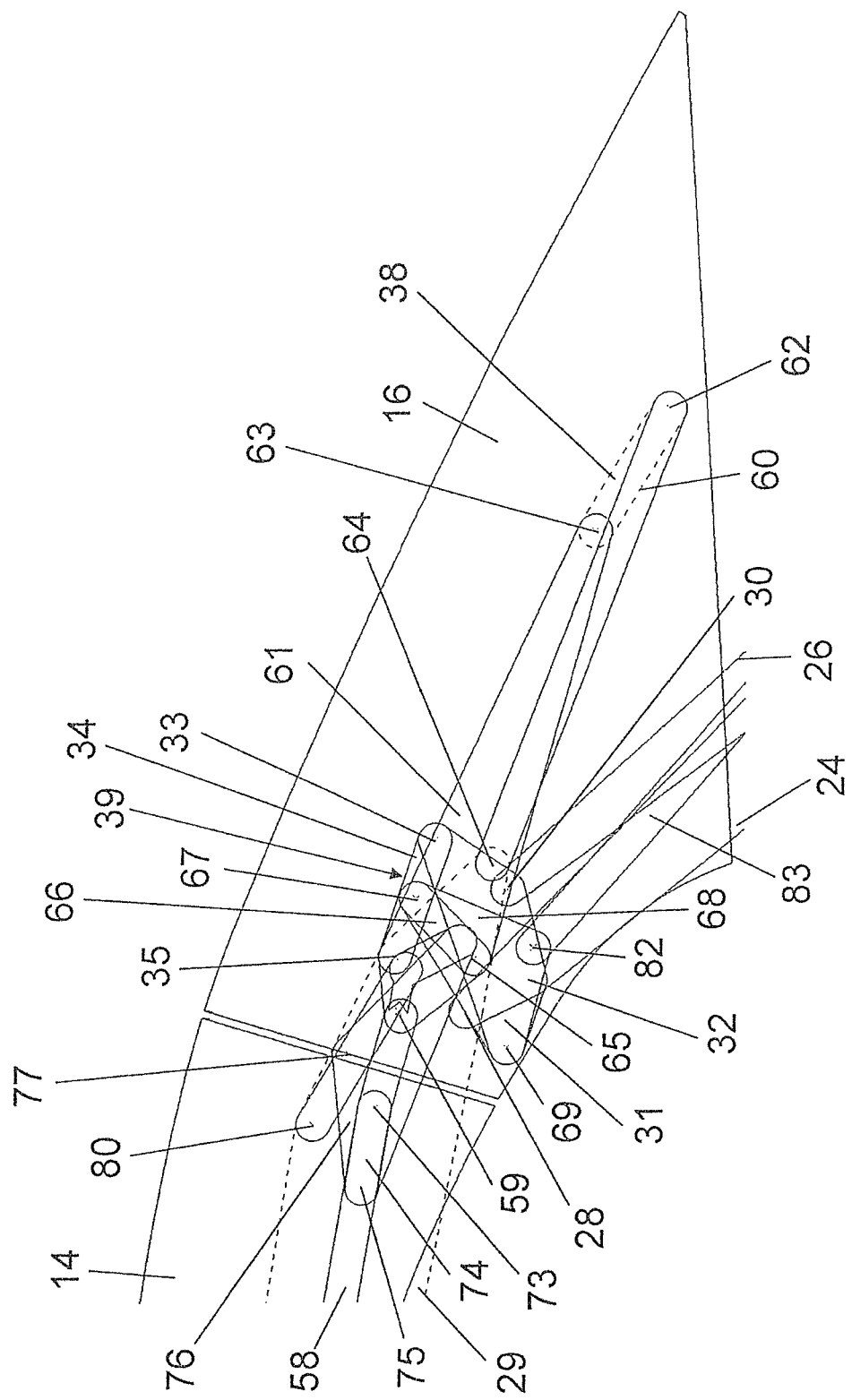
Figure 2:
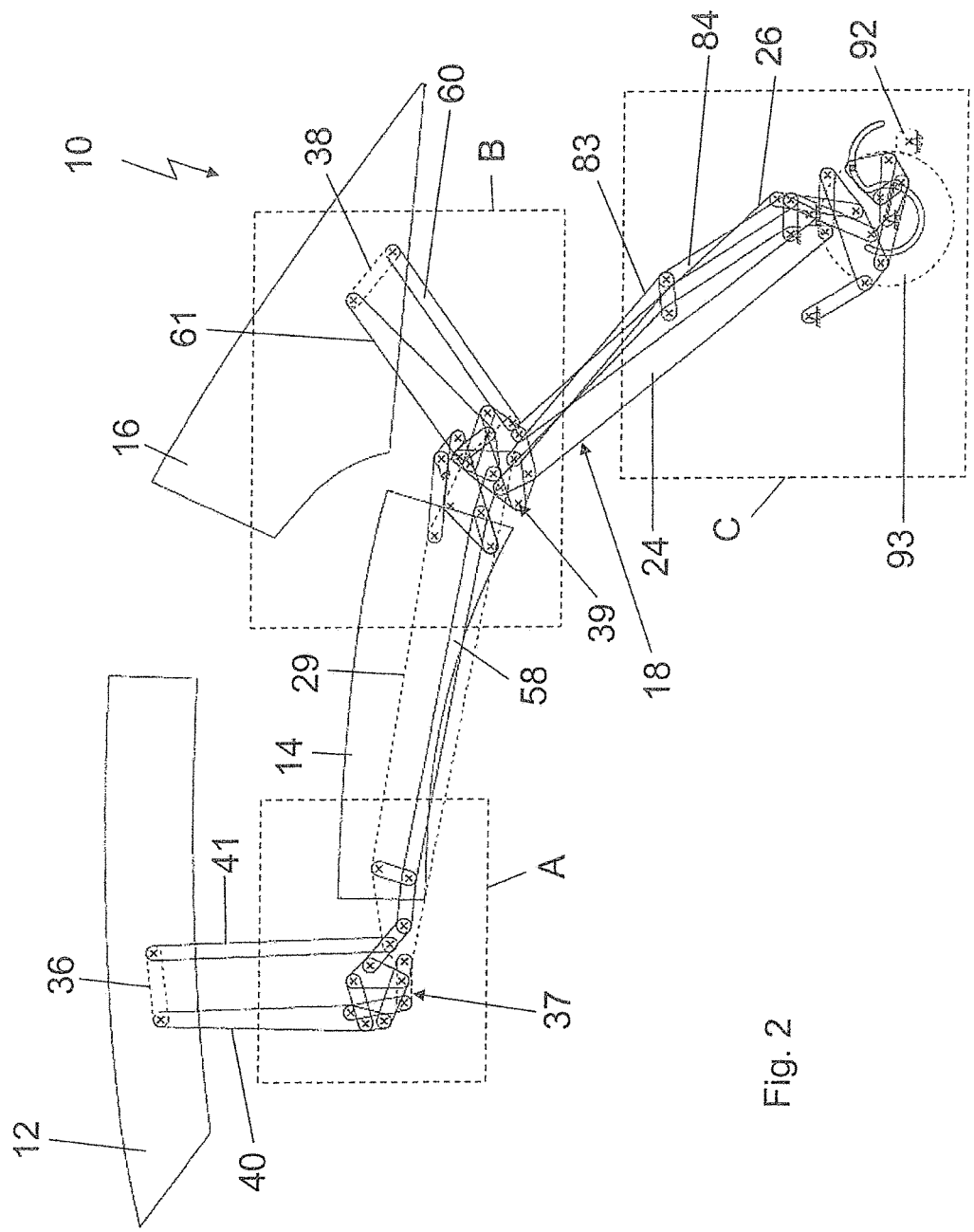
FIG. 2 shows a view corresponding to FIG. 1, but in a first intermediate position.
Figure 2B:
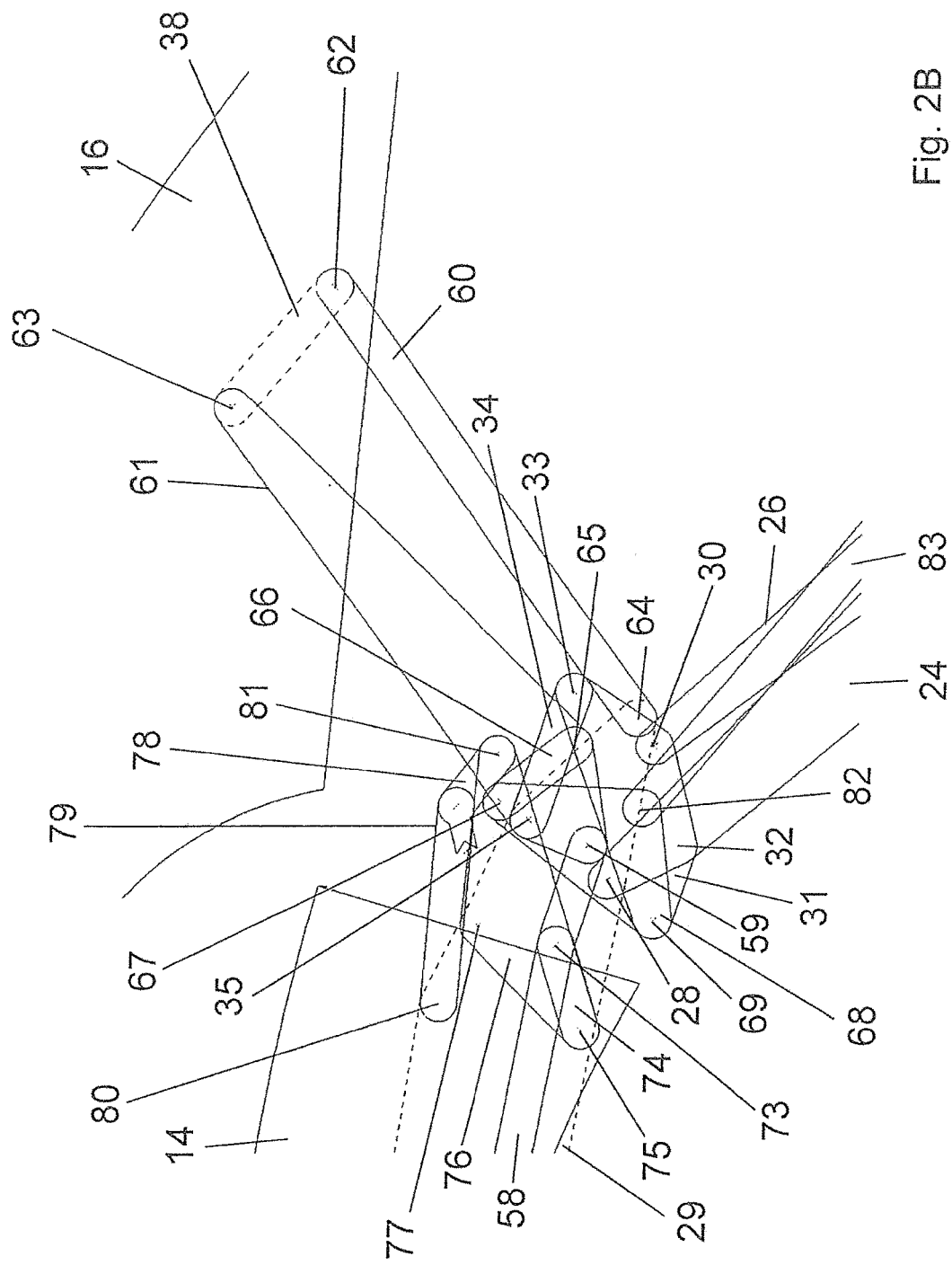
FIGS. 2A, B and C show enlarged illustrations of sections A, B and C in FIG. 2.
Figure 3:
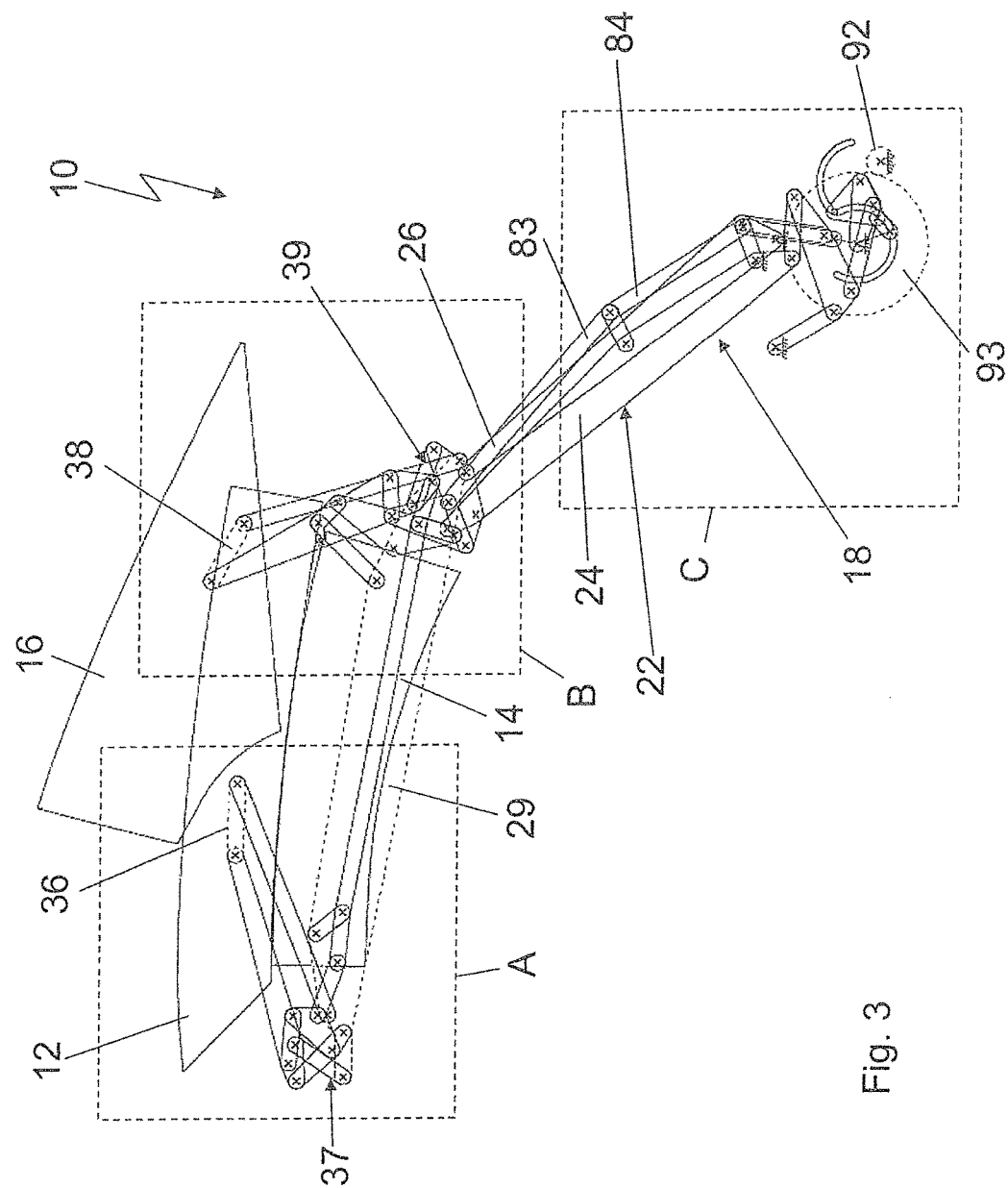
FIG. 3 also shows a view corresponding to FIG. 1, but in a second intermediate position.
Figure 3C:
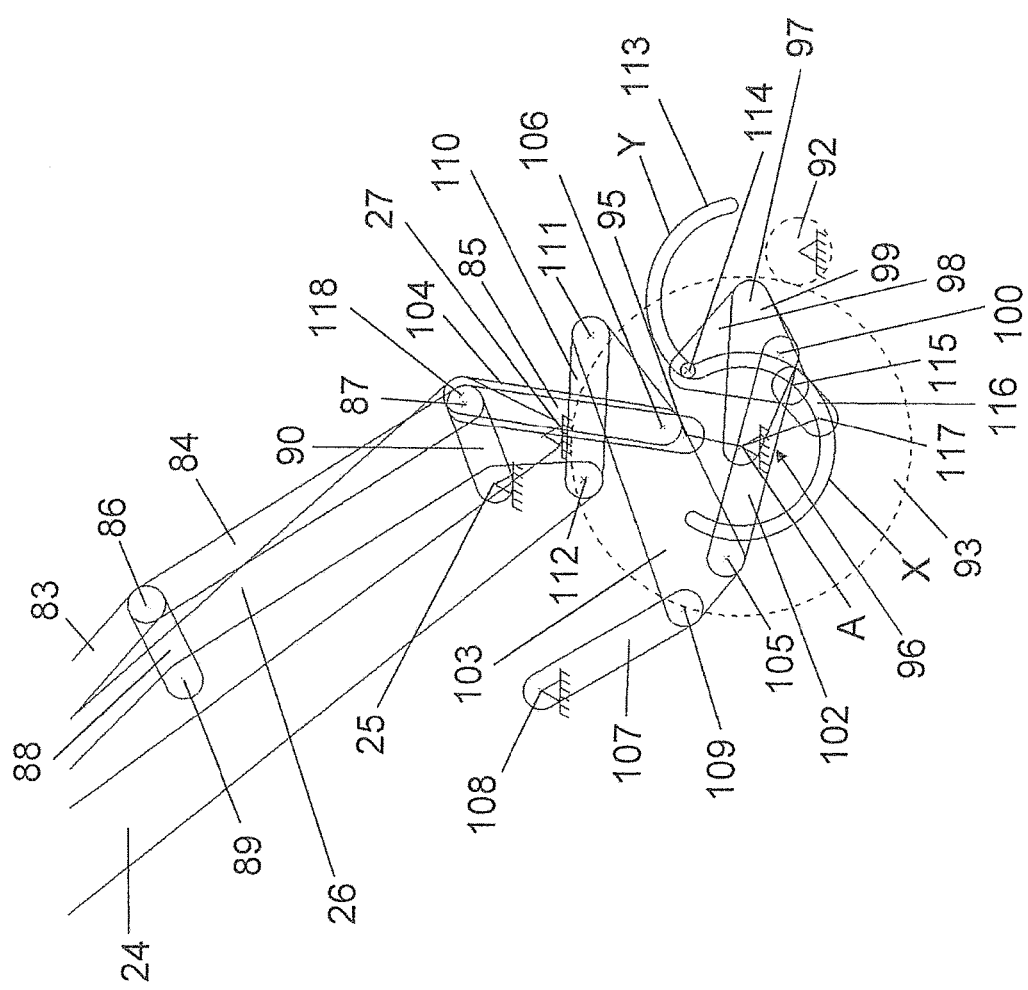
FIGS. 3A, B and C show enlarged illustrations of sections A, B and C in FIG. 3.
Figure 4A:
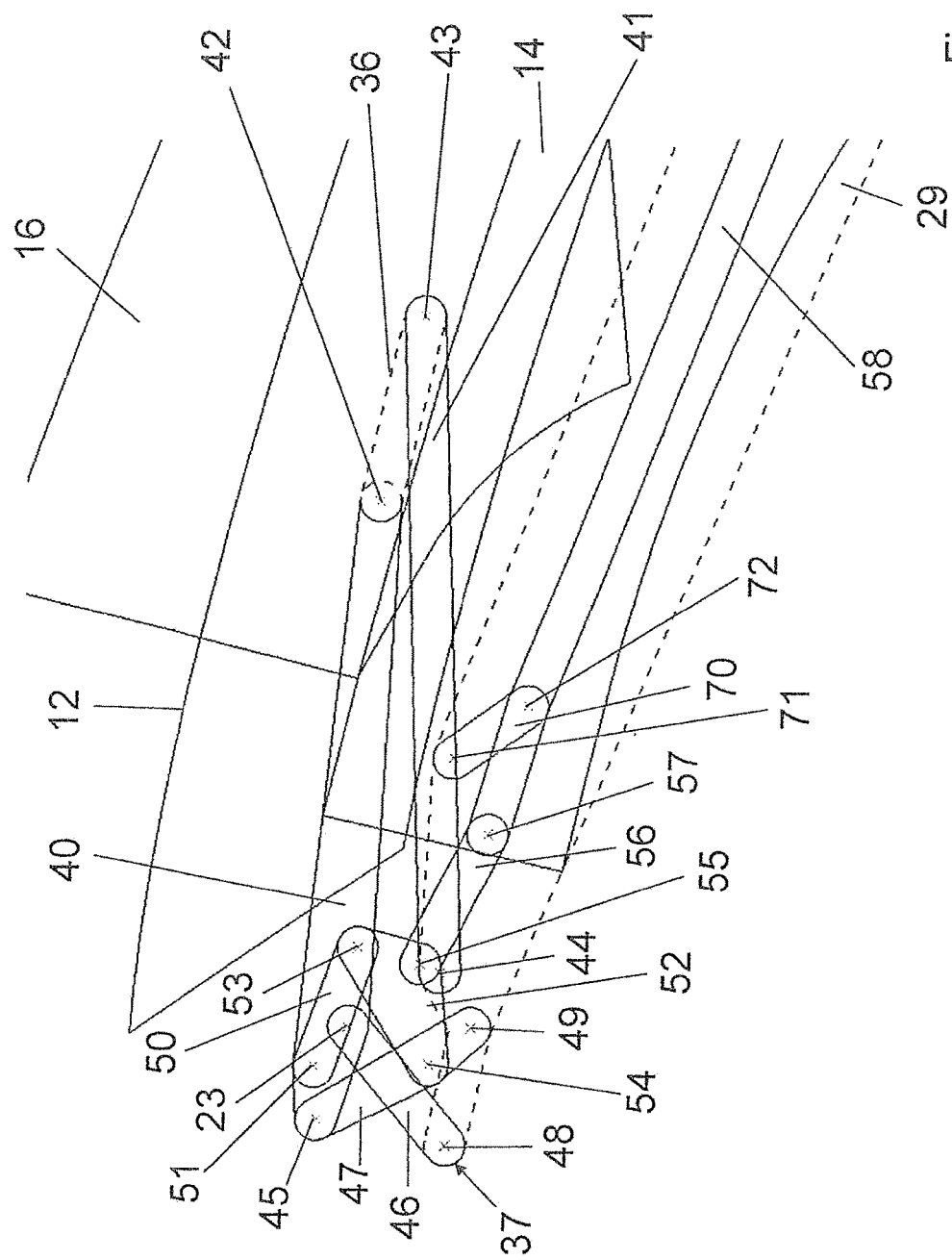
FIGS. 4A, B and C show enlarged illustrations of sections A, B and C in FIG. 4.
Figure 4B:
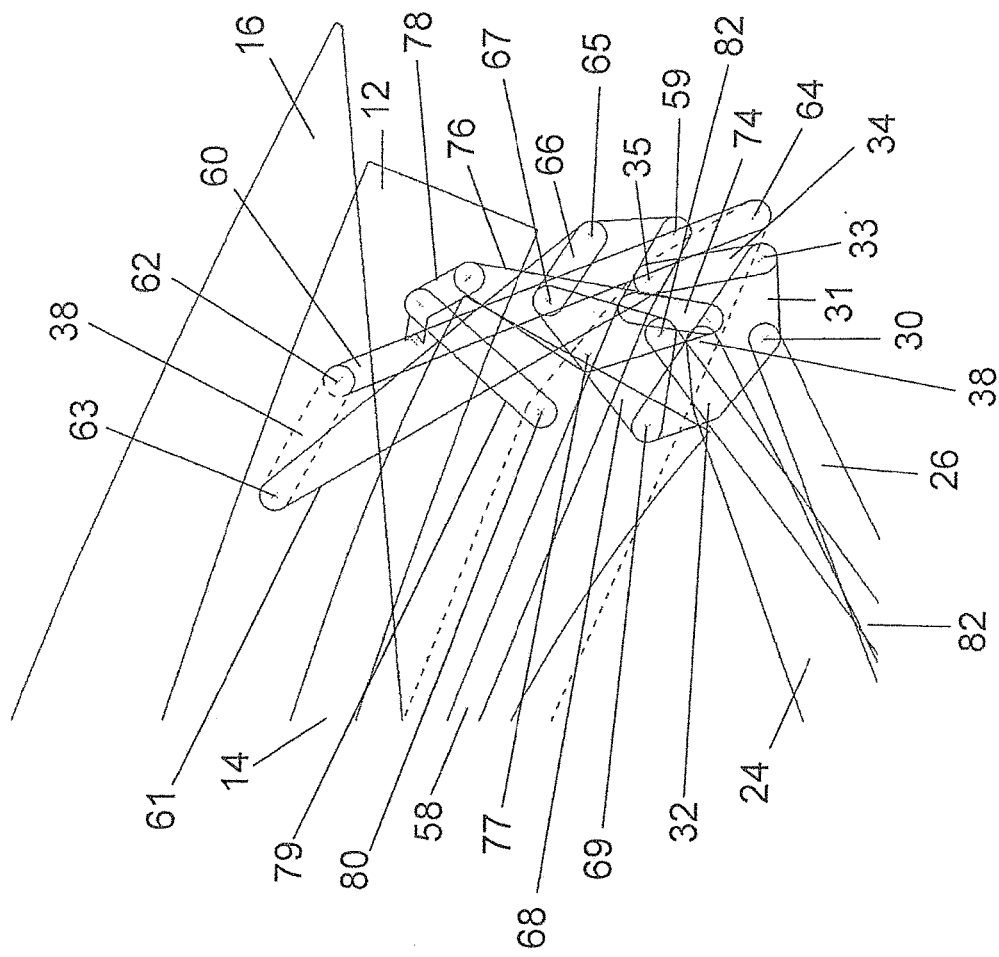
FIG. 4 also shows a view corresponding to FIG. 1, but in a third intermediate position.
Figure 4C:
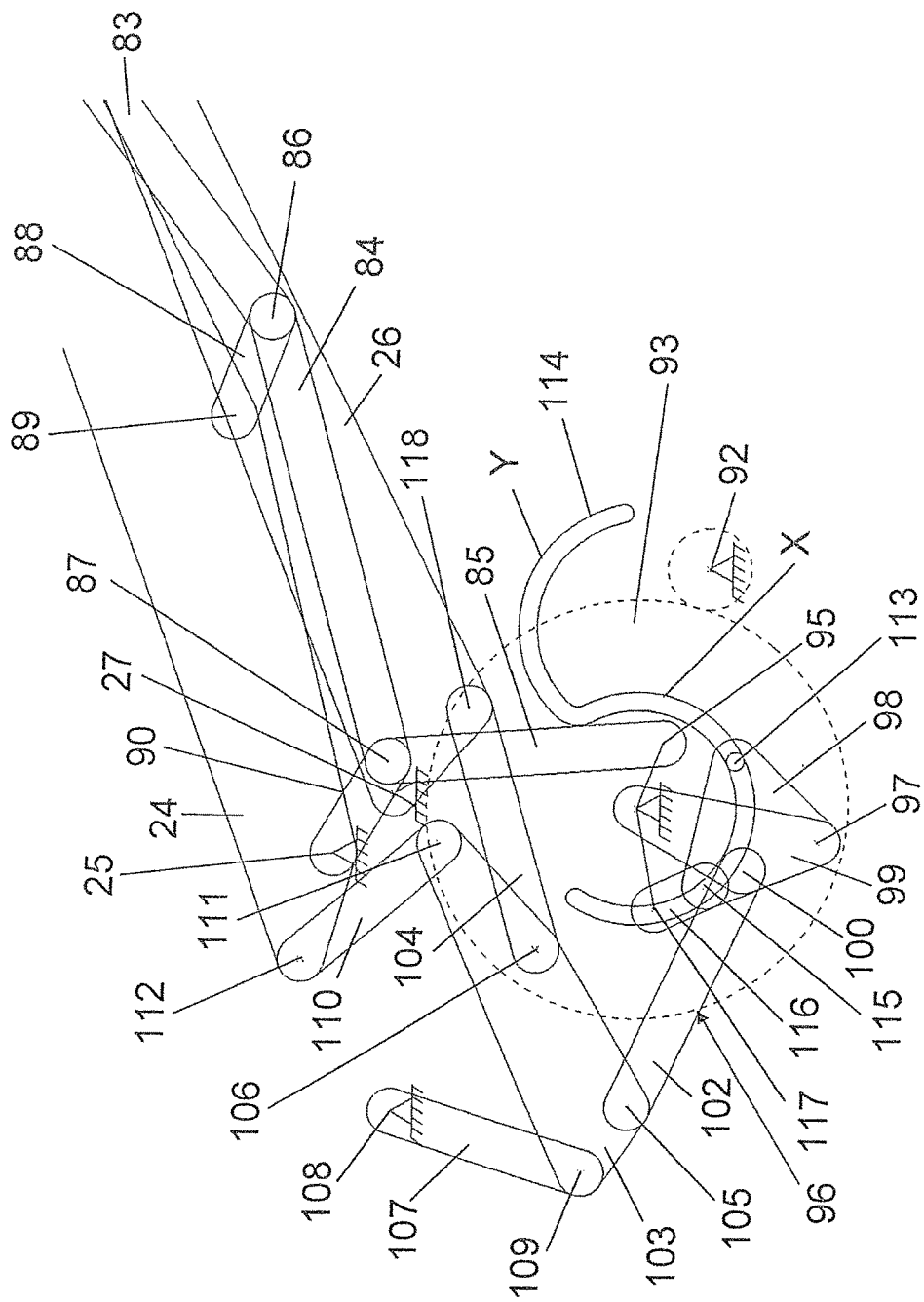

Starting from the closed position, which is illustrated in FIG. 1 and in which the vehicle interior is covered by the roof shells 12, 14 and 16, the drive wheel 93 is rotated clockwise with respect to the orientation in FIGS. 1 to 5 by actuation of the drive motor 94. In doing so, an adjusting torque is introduced into the shell main link 61 via coupling links 83, 84 and 85, triangular link 68 and control link 66, causing the rear-side roof shell 16 to be pivoted forward into a position above the middle roof shell 14 in the manner described in FIGS. 2 and 3. At the same time, an adjusting torque is introduced into the forward multi joint mechanism 37, causing the forward roof shell 12 to be pivoted in relation to the middle roof shell 14, as well. Thus, the roof shells 12, 14 and 16 are arranged one on top of the other in a stacked manner, the forward roof shell 12 being arranged between the rear roof shell 16 and the middle roof shell 14 (FIG. 3).

During the above-described first adjusting phase for roof shells 12 and 16 in relation to roof shell 14, the main multi joint mechanism, which comprises the two main links 24 and 26, is not actuated, yet. This is ensured in that the guiding pin 113 of the control link 98 is guided in rail section Y of the guide rail 114 and, thus, there is no adjusting torque being introduced into the second main link 26 via the intermediate links 102, 103 and 104. The adjusting process for roof shells 12 and 16 is largely finished when the guiding pin 113 reaches the inflection point between rail sections Y and X of the guide rail 114. If the drive wheel 93 now continues to be rotated clockwise, the control link 98, the triangular control arm 99 and the transmission link 116 are locked for co-rotation in relation to the drive wheel 93, which means that they continue to rotate together with the drive wheel 93 in the clockwise sense. Thus, an adjusting torque is introduced into the second main link 26 via the intermediate links 102, 103 and 104, the top thus being moved into its storage position illustrated in FIG. 5 in the manner illustrated in FIGS. 4 and 5. In this process, the guiding pin 113 travels through rail section X of the guide rail 114.

The top is adjusted from the storage position into the closed position illustrated in FIG. 1 in the correspondingly reverse manner.

The invention claimed is:

1. A top of a convertible vehicle, said top comprising:
a top linkage adjustable between a closed position, in which a vehicle interior is covered by the top, and a storage position, in which the vehicle interior is uncovered; and
a linkage mechanism forming part of said top linkage on each of two opposite sides of said top linkage with respect to a vertical longitudinal center plane of the top, each linkage mechanism including a main multi joint mechanism having two main links pivotably mounted on a vehicle-fixed main bearing, a middle roof link, a forward roof link pivotably connected to the middle roof link, and a rear roof link pivotably connected to the middle roof link, the forward roof link and the rear roof link being pivotable together in relation to the middle roof link by a coupling rod and the main multi joint mechanism being driven by a main drive arranged on the main bearing, and wherein the forward roof link and the rear roof link are driven by the main drive via a coupling device so as to pivot in relation to the middle roof link, wherein the coupling device includes a coupling link mechanism guided along the main multi joint mechanism and connected to a multi joint mechanism linked to the rear roof link.

2. The top according to claim 1, wherein the coupling link mechanism includes at least two coupling links supported in a shared point of articulation or on separate points of articulation on a diverting lever pivotably mounted on one of the main links or on the main bearing.

3. The top according to claim 1, wherein the multi joint mechanism for the rear roof link includes a triangular link pivotably mounted on a diverting lever connecting the two main links and to which the coupling link mechanism and a control link are linked, the control link being connected to a connecting link linked to the rear roof link.

4. The top according to claim 3, wherein the coupling rod is connected to the connecting link.

5. The top according to claim 1, wherein the main drive includes a drive wheel linked to the coupling link mechanism.

6. The top according to claim 5, wherein the drive wheel drives a transmission, which has multiple intermediate links and drives the main multi joint mechanism.

7. The top according to claim 5, wherein when the drive wheel rotates, the coupling link mechanism is always subjected to a drive torque and the main multi joint mechanism is either kept in position or subjected to a drive torque as a function of the position of a guiding element in a guide rail fixed to the main bearing.

8. The top according to claim 7, in which the guiding element is formed on a connecting link pivotably connected to a triangular control arm whose pivot axis coincides with an axis of rotation of the drive wheel.

9. The top according to claim 7, wherein the guide rail has a first rail section, which extends concentrically to the circumference of the drive wheel, and a second rail section, which extends in an arc in the opposite sense of the first rail section, so that the drive torque is introduced into the main multi joint mechanism by the drive wheel when the guiding element is arranged in the first rail section and the main multi-joint mechanism of the drive wheel stands still when the guiding element is arranged in the second rail section.

10. The top according to claim 5, wherein the drive wheel is a gear wheel driven by a drive pinion of the main drive.

11. The top according to claim 1, wherein the top is a retractable hard top having three roof shells, of which a first roof shell is linked to the forward roof link, a second roof shell is linked to the middle roof link and a third roof shell is linked to the rear roof link.

* * * * *